(No Model.)
W. HASSALL.
JOINT FOR PIPES FOR WATER, GAS, ELECTRIC WIRES, &c.
No. 318,616. Patented May 26, 1885.
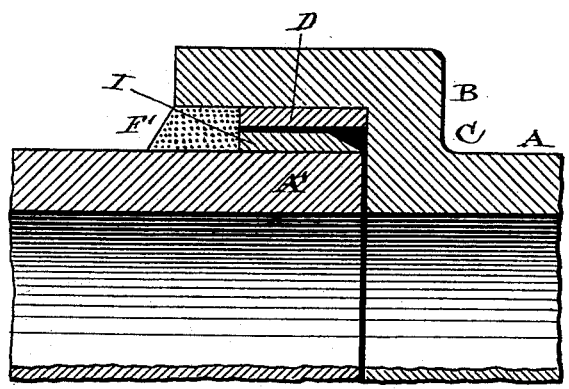
WITNESSES
INVENTOR

United States Patent Office.

WILLIAM HASSALL, OF BEESTON, COUNTY OF NOTTINGHAM, ENGLAND.

JOINT FOR PIPES FOR WATER, GAS, ELECTRIC WIRES, &c.

SPECIFICATION forming part of Letters Patent No. 318,616, dated May 26, 1885.

Application filed August 1, 1884. (No model.) Patented in England March 4, 1884, No. 4,357.

*To all whom it may concern:*

Be it known that I, WILLIAM HASSALL, of Beeston, in the county of Nottingham, Kingdom of England, have invented certain new and useful Improvements in Joints for Pipes for Water, Gas, Electric Wires, and the like, (for which I have received Letters Patent for Great Britain, dated March 4, 1884, No. 4,357,) of which the following is a specification.

This invention relates to an improved joint for water, gas, and sewage pipes, and for pipes for conveying compressed air, inclosing electric conductors, and other purposes.

The figure in the accompanying drawing is a vertical section of my improved pipe-joint.

Similar letters of reference indicate corresponding parts.

In the drawing, A represents one pipe-section, which is provided with a socket, B, and a shoulder, C, at the inner end of the socket. A' is the adjoining pipe-section, the spigot end of which is inserted into the socket B and tightly fitted thereto by two concentric rings, D and I, which are either cast by means of a cylindrical mold into the socket B and around the spigot end of the pipe A' or placed loosely therein, as desired. Between the adjoining surfaces of the rings D and I a plastic cement—such as mastic or like cement—is placed, by which a tight joint is formed. The inner edge of the ring I is made beveled, so as to prevent the cement from being forced forward into the socket B when the pipes are being pressed together. The surplus cement fills the annular space formed between the beveled edge of the inner ring and the outer ring, as shown in the drawing. This pipe-joint is very effective when the same is not exposed to much strain or pressure.

In the drawing a ring or band, F', of Portland or other cement, is cast around the outer ends of the rings D and I, said ring closing the mouth of the socket. For metal pipes the rings may be respectively bored and turned in the lathe to insure accuracy.

For other pipes they may be made of earthenware or vitreous composition, vulcanite, or other suitable material, according to the purpose for which the pipe is required.

Having thus described my invention, I claim as new and desire to secure by Letters Patent—

The combination of a pipe-section provided with a straight socket having a square shoulder at its inner end, a ring within said socket concentric therewith, a spigot-section provided with an exterior ring adapted to fit within the socket-ring, the inner edge of said spigot-ring being beveled opposite the straight face of the socket-ring, and a ring or band of cement within said socket above said rings, substantially as described.

In testimony that I claim the foregoing as my invention I have signed my name in presence of two subscribing witnesses.

WM. HASSALL.

Witnesses:
 WM. WHITTLEY,
 M. SHAW,
  *Both of Nottingham.*